(12) United States Patent
Ciampolini et al.

(10) Patent No.: US 8,072,114 B2
(45) Date of Patent: Dec. 6, 2011

(54) ELECTRIC MOTOR WITH BAR WINDING AND CONNECTION PLATES

(75) Inventors: Franco Ciampolini, Bologna (IT);
Augusto Eugenio Michele Maria Guccione, Arona (IT); Egidio D'Alpaos, Pieve D'Alpago (IT); Paolo Lissoni, Concorezzo (IT)

(73) Assignee: Magneti Marelli S.p.A., Corbetta (IT)

( * ) Notice: Subject to any disclaimer, the term of this patent is extended or adjusted under 35 U.S.C. 154(b) by 201 days.

(21) Appl. No.: 12/429,026

(22) Filed: Apr. 23, 2009

(65) Prior Publication Data

US 2010/0045133 A1    Feb. 25, 2010

(30) Foreign Application Priority Data

Apr. 24, 2008 (EP) ..................... 08425290

(51) Int. Cl.
*H02K 3/12* (2006.01)
*H02K 11/00* (2006.01)
(52) U.S. Cl. ............................ 310/201; 310/208; 310/71
(58) Field of Classification Search .................... 310/71, 310/201, 208, 179, 195; *H02K 3/04*
See application file for complete search history.

(56) References Cited

U.S. PATENT DOCUMENTS

| | | | | |
|---|---|---|---|---|
| 5,623,178 A * | 4/1997 | Kawabata et al. | ............ | 310/260 |
| 5,828,147 A * | 10/1998 | Best et al. | ......................... | 310/71 |
| 6,011,339 A * | 1/2000 | Kawakami | .................... | 310/208 |
| 6,208,056 B1 * | 3/2001 | Perkins | ........................... | 310/179 |
| 6,300,697 B1 * | 10/2001 | Findeisen et al. | ........... | 310/68 B |
| 6,538,356 B1 | 3/2003 | Jones | | |
| 6,555,941 B1 * | 4/2003 | Zepp et al. | ..................... | 310/191 |
| 6,710,496 B2 * | 3/2004 | Fujita et al. | .................... | 310/201 |
| 7,224,095 B2 * | 5/2007 | Chen | ............................. | 310/190 |
| 7,936,116 B2 * | 5/2011 | Asou et al. | ....................... | 310/71 |
| 2004/0189127 A1 | 9/2004 | Kobayashi et al. | | |
| 2005/0023910 A1 * | 2/2005 | Lukenich | ......................... | 310/71 |
| 2005/0189833 A1 | 9/2005 | Liao | | |
| 2006/0181165 A1 * | 8/2006 | Baenziger et al. | ............... | 310/71 |
| 2007/0251748 A1 * | 11/2007 | Downs et al. | .................. | 180/243 |
| 2009/0102309 A1 * | 4/2009 | Kamibayashi et al. | ........ | 310/195 |
| 2010/0045134 A1 | 2/2010 | Ciampolini et al. | | |

FOREIGN PATENT DOCUMENTS

DE    4234175 A1    4/1994

(Continued)

OTHER PUBLICATIONS

Extended European Search Report issued Dec. 16, 2008, in EP Application No. 08425290.7 filed Apr. 24, 2008.
European PO; search report in foreign application (EP 08425289.9) to which priority is claimed by U.S. Appl. No. 12/429,060 which is related to the present application; Oct. 10, 2008.
U.S. Appl. No. 12/429,060, Feb. 2, 2011, Office Action.

(Continued)

*Primary Examiner* — Quyen Leung
*Assistant Examiner* — Thomas Truong
(74) *Attorney, Agent, or Firm* — Workman Nydegger

(57) ABSTRACT

A multiphase synchronous electrical machine for converting kinetic energy into electrical energy and electrical energy into kinetic energy has a rotor, extending along an axis, and a stator, which is provided with a stator pack having slots and with an electrical winding, which extends in part in the slots and in part at two heads arranged on opposite sides of the stator pack and which has bars, housed in the slots and connected to one at the heads, connection plates, each of which has: a main body having at least two seats for housing the bars; and an arm, which is set between the two seats and extends from the main body towards the axis.

13 Claims, 7 Drawing Sheets

FOREIGN PATENT DOCUMENTS

| | | |
|---|---|---|
| EP | 1168574 A2 | 1/2002 |
| GB | 1038011 | 8/1966 |
| WO | 92/11682 | 7/1992 |
| WO | 2007/108552 A1 | 9/2007 |

OTHER PUBLICATIONS

U.S. Appl. No. 12/429,060, mailed Sep. 1, 2011, Notice of Allowance.

* cited by examiner

ELECTRIC MOTOR WITH BAR WINDING AND CONNECTION PLATES

CROSS REFERENCE TO RELATED APPLICATIONS

This application is related to the following:
U.S. patent application Ser. No. 12/429,060 filed Apr. 23, 2009.

This application claims priority to European Patent Application No. 08425290.7 filed on Apr. 24, 2008, the disclosure of which is incorporated herein, in its entirety, by this reference.

TECHNICAL FIELD

The present invention relates to a multiphase synchronous electrical machine for converting kinetic energy into electrical energy and electrical energy into kinetic energy on board a transport vehicle.

In particular, the present invention relates to a three-phase synchronous electrical machine, which comprises: a rotor with permanent magnets extending along an axis, and a stator provided with a stator pack having slots and with an electrical winding, which extends in part in the slots and in part in a position corresponding to two heads arranged on opposite sides of the stator pack and comprises bars housed in the slots and connected to one another in a position corresponding to the heads.

BACKGROUND OF THE INVENTION

The use of electrical machines of the type identified above finds increasingly widespread application in transport vehicles, in particular, in transport vehicles equipped with an internal-combustion engine and in which the electrical machines have the function of generating electrical energy during braking of the transport vehicle and of converting the electrical energy into motive force in given operating conditions. These transport vehicles are generally defined as hybrid vehicles or hybrid-propulsion vehicles.

The process of conversion of kinetic energy into electrical energy and of electrical energy into kinetic energy requires installation on board the motor vehicle of an additional system known as KERS (Kinetic Energy Recovery System), which comprises, in addition to the electrical machine of a reversible type, a unit for accumulation of the electrical energy, and a control unit connected to the electrical machine and to the accumulation unit.

The additional system, albeit providing encouraging results from the standpoint of the reduction of consumption and pollutants, in effect, increases the weight and the overall dimensions of the transport vehicle, and in many cases the application of said type of additional system is still limited.

SUMMARY OF THE INVENTION

An aim of the present invention is to provide a multiphase synchronous electrical machine for converting kinetic energy into electrical energy and electrical energy into kinetic energy on board a transport vehicle that will be free from the drawbacks of the known art.

Furthermore, an aim of the present invention is to provide a multiphase synchronous electrical machine for converting kinetic energy into electrical energy and electrical energy into kinetic energy on board a transport vehicle that will be very resistant to stresses and at the same time capable of providing high levels of performance.

In accordance with the above purposes, a multiphase synchronous electrical machine is provided for converting kinetic energy into electrical energy and electrical energy into kinetic energy on board a transport vehicle, the electrical machine comprising a rotor extending along an axis, and a stator provided with a stator pack having slots set parallel and with an electrical winding, which extends in part in the slots and in part at two heads arranged on opposite sides of the stator pack and comprises bars housed in the slots and connected to one another at the heads, the electrical machine being characterized in that the electrical winding comprises connection plates, each of which comprises: a main body having at least two seats for housing the bars; and at least one arm, which is set between the two seats and extends from the main body towards the axis.

In this way, the electrical winding is very compact and has connection plates of considerable dimensions and is able to exploit in an optimal way the space available in a position corresponding to the heads, thus minimizing the total volume.

BRIEF DESCRIPTION OF THE DRAWINGS

Further characteristics and advantages of the present invention will emerge clearly from the ensuing description of a non-limiting example of embodiment thereof, with reference to the figures of the annexed drawings, wherein.

DETAILED DESCRIPTION OF THE INVENTION

Figure 1:
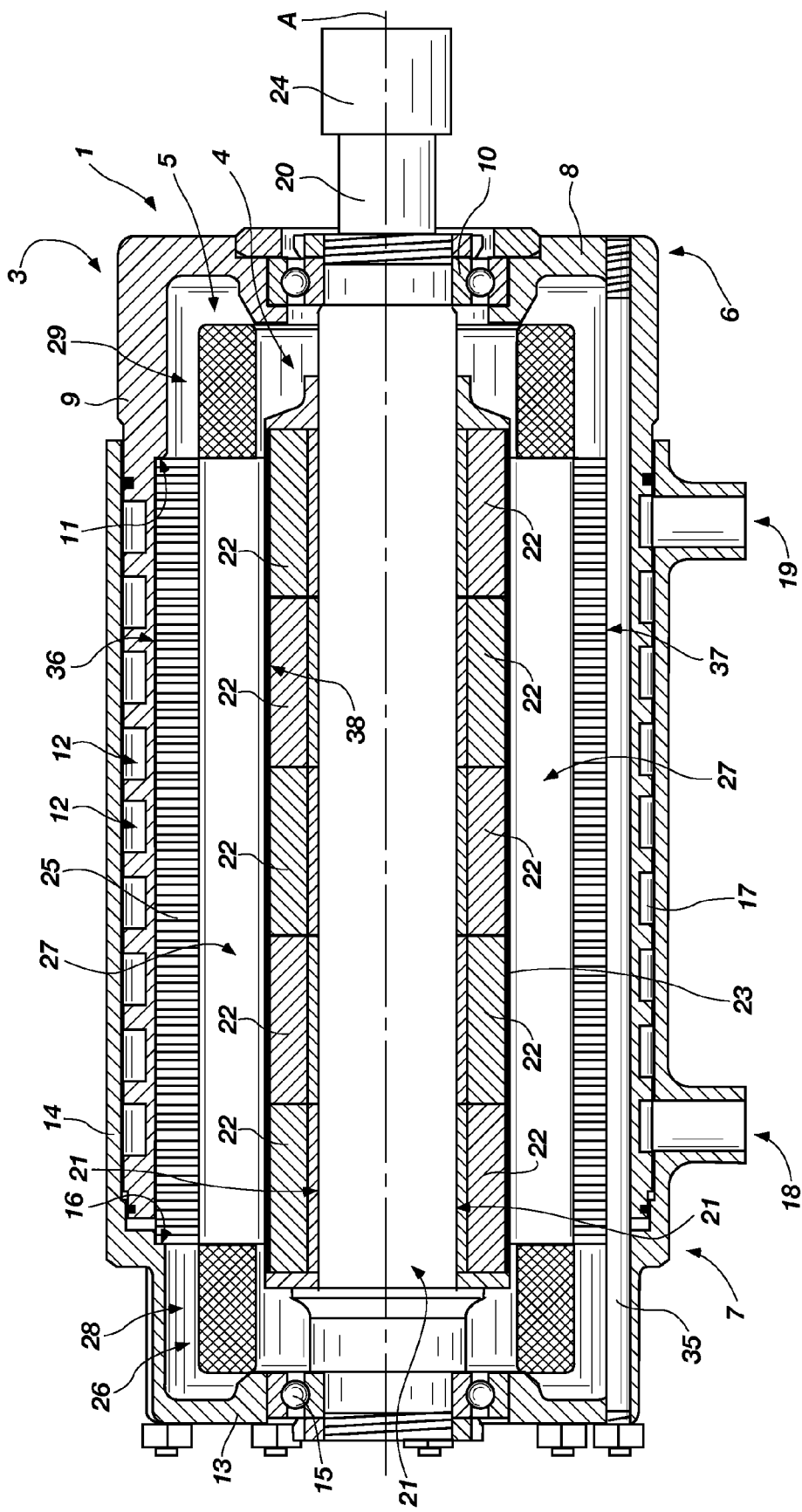
FIG. 1 is a longitudinal sectional view, with parts removed for reasons of clarity, of an electrical machine built in accordance with the present invention.

In FIG. 1, designated as a whole by the reference number 1 is a multiphase synchronous electrical machine for converting kinetic energy into electrical energy and electrical energy into kinetic energy on board a transport vehicle (not illustrated in the attached figures).

In particular, the electrical machine 1 is a very compact reversible three-phase synchronous electrical machine capable of supplying a high power with respect to the weight of the electrical machine 1 itself. The electrical machine 1 has a substantially cylindrical shape, extends along an axis A, and is characterized in that it has an overall length greater than the diameter, in particular a length equal to approximately twice the diameter.

The electrical machine 1 comprises a supporting casing 3, a rotor 4 extending along the axis A, and a stator 5 set around the rotor 4.

The supporting casing 3 comprises two half-shells 6 and 7, fitted axially inside one another. The half-shells 6 and 7 have a substantially cylindrical shape and are assembled together around the rotor 4 and the stator 5. The half-shell 6 comprises an end flange 8, set perpendicular to the axis A, and a cylindrical wall 9 set parallel to the axis A. The flange 8 has a central hole for housing a bearing 10 for supporting the rotor 4, whilst the wall 9 has an internal shoulder 11, designed to be set bearing upon the stator 5, and an external helical groove 12.

The half-shell 7 comprises an end flange 13 set perpendicular to the axis A, and a cylindrical wall 14 set parallel to the axis A. The flange 13 has a central hole for housing a bearing 15 for supporting the rotor 4, whilst the wall 14 has an internal shoulder 16, designed to be set bearing upon the stator 5.

The wall 14 partially overlaps the wall 9 in a position corresponding to the external helical groove 12 so as to form a helical cooling chamber 17, and has a supply mouth 18 and an outlet mouth 19 designed to be connected, respectively, to a pipe for supply and a pipe for evacuation of coolant (not illustrated in the attached figures), in particular, a liquid coolant, which is conveyed along the helical cooling chamber 17 for cooling the stator 5.

The rotor 4 comprises a shaft 20, which is supported by the bearings 10 and 15 and comprises a central portion, along which four plane faces 21 are provided, and a plurality of permanent magnets 22, which are arranged in a number of rows along the plane faces 21 equal to the number of poles of the electrical machine. In the case in point, illustrated in FIG. 1, the permanent magnets 22 are arranged in four rows of five permanent magnets 22 each. The use of a number of permanent magnets for each pole (row) is indicated for limiting the losses due to parasitic currents in the magnets themselves.

Each permanent magnet 22 is preferably made of samarium-cobalt and is glued to a respective plane face 21. The rotor 4 comprises a tube 23 made of carbon fibre set around the permanent magnets 22 to prevent possible detachment of the permanent magnets 22 from the shaft 20. According to an alternative embodiment (not illustrated in the attached figures), the tube 23 made of carbon fibre is omitted, and the rotor 4 comprises a Zylon® wire wound in a helix around the permanent magnets 22 so as to prevent detachment thereof.

The shaft 20 has one end set outside the supporting casing 3 and having a shank 24 for attachment to a gear or pulley (not illustrated in the attached figures). The rotor 4, in particular its active part defined by the permanent magnets 22, has a diameter sensibly smaller than the length of the rotor 4, in particular, smaller than the length of its active part so as to limit the centrifugal forces and guarantee low inertia to rotation and greater reactivity to the change of r.p.m.

The stator 5 comprises a stator pack 25 and an electrical winding 26. The stator pack 25 is formed by a pack of laminations set perpendicular to the axis A and has axial slots 27, i.e., ones set parallel to the axis A and facing the axis A. The electrical winding 26 comprises a first portion that extends within the slots 27 and a second portion that extends on the outside of the slots 27 and, in the case in point, is defined by two heads 28 and 29 set up against the opposite ends of the stator pack 25.

Figure 2:
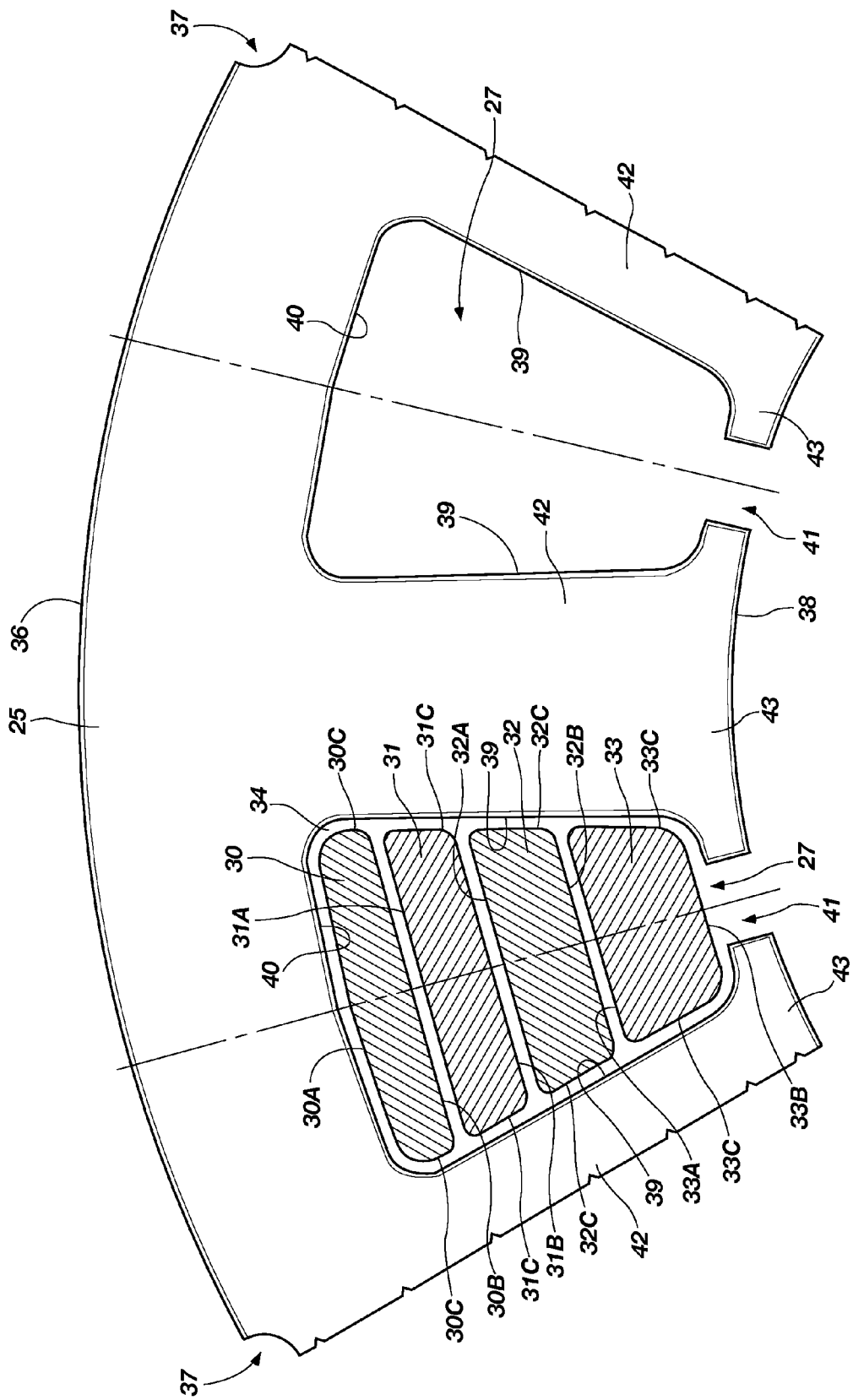
FIG. 2 is a view in front elevation at an enlarged scale, with parts removed for reasons of clarity, of a detail of the electrical machine of FIG. 1.

With reference to FIG. 2, the electrical winding 26 comprises conductive bars 30, 31, 32, 33, which are arranged in part in the slots 27 and in part in a position corresponding to the heads 28 and 29, in which the bars 30, 31, 32, 33 are connected to one another so as to define a given electrical scheme of the winding 26.

In the case in point, FIG. 2 illustrates a set formed by four bars 30, 31, 32, and 33 housed within a single slot 27. Basically, each slot 27 is occupied by a set of four bars 30, 31, 32, 33.

Wound around each of the bars 30, 31, 32, and 33 is an insulating tape, and each bar is further insulated from the stator pack 25 and from the other bars 30, 31, 32, 33 by a resin impregnated in the stator pack 25. Impregnation with the resin is performed once the entire electrical winding 26 has been completed and assembled on the stator pack 25. In FIG. 2, the resin and the insulating tape are designated as a whole by the reference number 34.

With reference to FIG. 1, the stator pack 25 is set bearing upon the shoulders 11 and 16, respectively, of the half-shells 6 and 7 and is gripped between the half-shells 6, 7, which are assembled by means of tie-rods 35 set parallel to the axis A.

Figure 3:
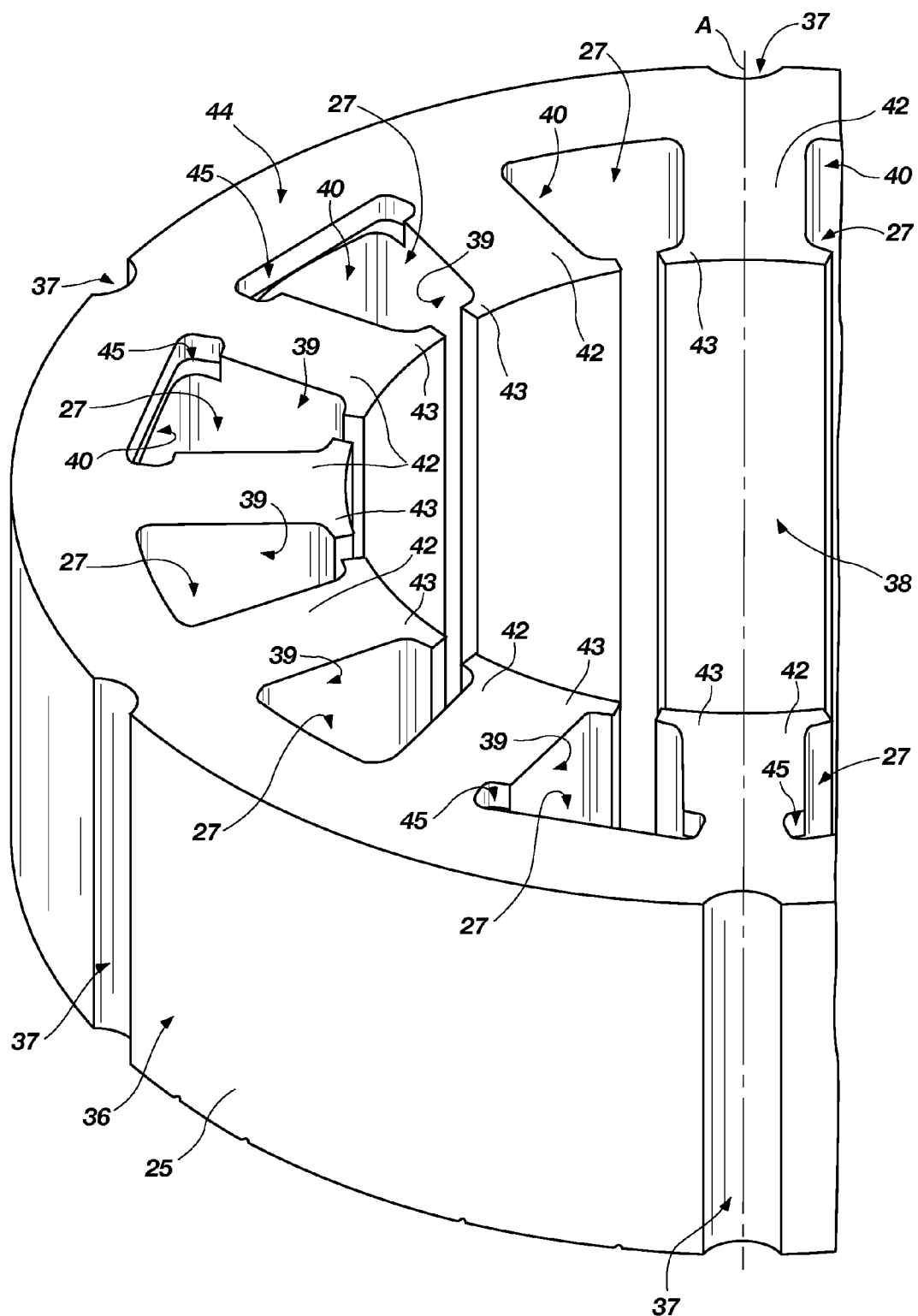
FIG. 3 is a perspective view, with parts removed for reasons of clarity and at an enlarged scale, of a component of the electrical machine of FIG. 1.

With reference to FIG. 3, the stator pack 25 has a substantially cylindrical shape, an outer surface 36 with grooves 37 set at intervals apart for housing the tie-rods 35, and an inner surface 38 interrupted by the twelve slots 27. It is understood that the number of slots 27 is a design parameter and, all the other characteristics being equal, the number of slots 27 can be chosen generally from any multiple of three.

Each slot 27 is delimited by two opposite, plane, side faces 39, converging towards the axis A, a bottom face 40 radiused to the side faces 39, and an opening 41 towards the axis A and towards which the side faces 39 are radiused. Two adjacent slots 27 are separated from one another by a diaphragm 42 that expands in a position corresponding to the opening 41 in a so-called polar expansion 43.

The stator pack 25 has two end faces 44 (just one of which is illustrated in FIG. 3) and, along said faces 44 and in a position corresponding to some slots 27, undercuts 45 defining respective seats, which are designed to enable insertion of respective tabs of insulating material for insulating the bars 30 after welding thereof in a position corresponding to the heads 28 and 29 (FIG. 1).

With reference to FIG. 2, each slot 27 has a cross section substantially shaped like an isosceles trapezium, in which the bottom face 40, even though slightly arched, represents the major base, the opening 41 basically defines the minor base, and the side faces 39 define the inclined sides of the isosceles trapezium.

The bars 30, 31, 32, and 33 of one and the same set of bars set in a slot 27 have respective cross sections having a shape and dimensions different from one another.

In greater detail, the bar 30 has a face 30A facing the bottom face 40, a face 30B, and two inclined faces 30C. The bar 30 is characterized by having a flattened shape: the height of the bar 30 measured in a radial direction, i.e., the height of the cross section of the bar 30, is sensibly smaller than the width of the face 30A and even less than half of the width of the face 30A.

The bar 31 has a face 31A facing the face 30B, a face 31B, and two inclined faces 31C. The bar 31 has a sturdier appearance as compared to the bar 30 and has a height greater than that of the bar 30.

The bar 32 has a face 32A facing the face 31B, a face 32B, and two inclined faces 32C. The bar 32 has a sturdier appearance as compared to the bar 31 and has a height (measured in a radial direction) greater than the height of the bar 31.

The bar 33 has a face 33A facing the face 32B, a face 33B facing the opening 41, and two inclined faces 33C. The bar 33 has a particularly elongated appearance: the height in a radial direction is greater than half the width of the face 33A and greater than the height of the bar 32.

In general, the bars 30, 31, 32, and 33 have an increasing height starting from the bottom face 40 towards the opening 41, and at the same time have an average width that decreases starting from the bottom face 40 towards the opening 41.

The sizing of the bars 30, 31, 32 and 33 of each set substantially enables the inclined faces 30C, 31C, 32C and 33C to be kept aligned and a cross section of the same shape and substantially complementary to the cross section of the slot 27 to be thus defined for each set of bars 30, 31, 32, and 33.

In particular, the inclined faces 30C, 31C, 32C, 33C of each bar 30, 31, 32, 33 are set facing and parallel to a respective side face 39 of the slot 27.

Furthermore, the face 30A is set parallel to the bottom face 40, whilst the faces 31A, 32A, 33A, and the faces 30B, 31B, 32B, 33B, of each bar 30, 31, 32, 33, are set parallel to one another.

The only difference between the cross section of the set of bars 30, 31, 32 and 33 and the cross section of the slot 27 is determined by the inevitable presence of the insulating material 34, which must be set between the bars 30, 31, 32 and 33 and the inclined faces and the bottom face 40 of the slot 27, and in any case the gap occupied by the insulating material is of the order of tenths of a millimetre, the representation in FIG. 2 being at a very enlarged scale.

The shape of the bars 30, 31, 32 and 33 and their arrangement in the slot 27 enable a filling of the slot 27 that is better than that of the known art, with values of up to ninety-five per cent, which guarantees a very high efficiency of the electrical machine 1.

At the same time, the progressive increase of the height of the bars 30, 31, 32 and 33 and the reduction of the average width thereof in a radial direction towards the axis A guarantees an efficient heat exchange also for the innermost bars 32 and 33 and consequently increases the efficiency and performance of the electrical machine 1. To enable a clearer understanding of this statement, it should be recalled that the cooling chamber 17 delimited by the half-shells 6 and 7 is basically in contact with the stator pack 25 along the outer surface 36 thereof. Consequently, the stator pack 25 has an increasing thermal gradient starting from the outer surface 36 towards the inner surface 38. It follows that the bars 32 and 33 closer to the inner surface 38 are at a disadvantage as regards the thermal jump, which is a fundamental parameter that regulates heat exchange. For this reason, the progressive increase of the height and the reduction of the average width of the bars 30, 31, 32, 33 enables faces 30C, 31C, 32C, 33C to be defined that progressively increase towards the thermally unfavoured areas of the stator pack 25, and a satisfactory heat exchange to be provided also in those areas.

Figure 4:
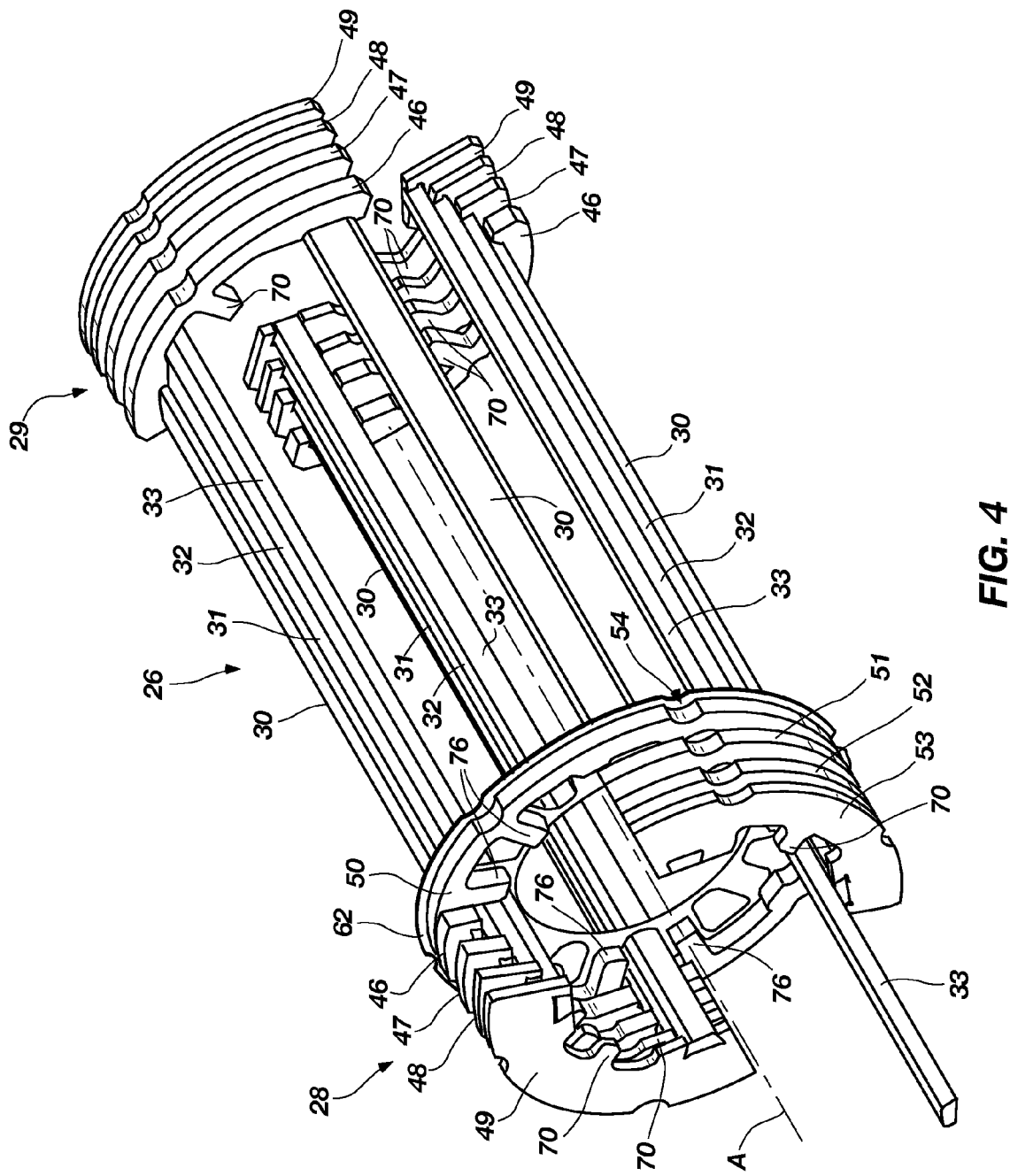
FIG. 4 is a perspective view, with parts removed for reasons of clarity, of a component of the electrical machine of FIG. 1.

With reference to FIG. 4, for reasons of greater clarity the electrical winding 26 is illustrated only in part and with reference to just one of the three phases that characterize said electrical winding 26.

As illustrated in FIG. 4, the bars 30, 31, 32, and 33 of one and the same phase are connected to one another in a position corresponding to the two heads 28 and 29 to define a given electrical arrangement of one of the three phases of the electrical machine 1. For each phase, the head 29 comprises eight connection plates 46, 47, 48 and 49, each of which is connected to two of the bars 30, 31, 32 and 33.

The head 28 comprises: an annular connection plate 50, which is common to all three phases and is designed to be connected to three bars 30 (just one of which is illustrated in FIG. 4) of three different phases and defines the star centre of the electrical machine 1; four connection plates 46, 47, 49 and 50, each of which is connected to two of the bars 30, 31, 32 and 33; and three connection plates 51, 52, 53, each of which is connected to two of the bars 30, 31, 32, 33.

In the case in point, each connection plate 46 is connected to two bars 30 of the same phase; each connection plate 47 is connected to two bars 31 of the same phase; each connection plate 48 is connected to two bars 32 of the same phase; and each connection plate 49 is connected to two bars 33 of the same phase.

The connection plate 51 is connected to a bar 30 and to a bar 31 of the same phase; the connection plate 52 is connected to a bar 31 and to a bar 32 of the same phase; and the connection plate 53 is connected to a bar 32 and to a bar 33 of the same phase.

A bar 33 extends axially beyond the connection plate 52 and is connected to a terminal of the electrical machine 1 (not illustrated in the attached figures).

Figure 5:
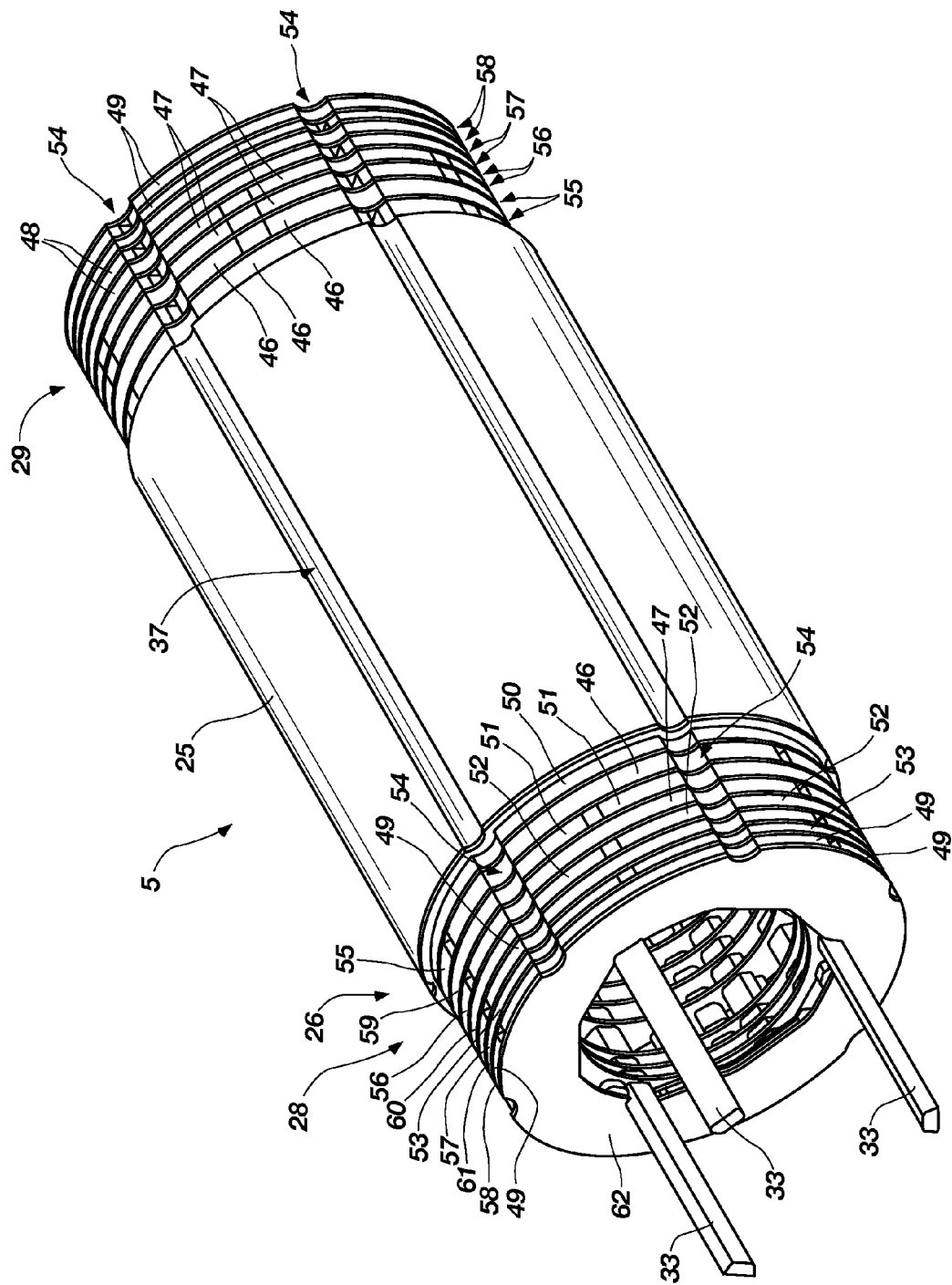
FIG. 5 is a perspective view, with parts removed for reasons of clarity and at an enlarged scale, of a further component of the electrical machine of FIG. 1.

With reference to FIG. 5, the stator pack 25 is provided with the electrical winding 26.

In the case in point, the head 29 is formed by the connection plates 46, 47, 48 and 49, packed with respect to one another and against the face 44 (FIG. 3) of the stator pack 25, and the head 28 is formed by the connection plates 46, 47, 48, 49, 51, 52 and 53 and by the annular connection plate 50, packed with respect to one another and to the face 44 (FIG. 3) of the stator pack 25.

All the connection plates 46, 47, 48, 49, 51, 52 and 53 share the common characteristic of having a shape like the arc of a circle, an external profile having a radius equal to the external radius of the stator pack 25, and have grooves 54 that are identical, as regards cross section and angular position about the axis A, to the grooves 37 of the stator pack 25 so as to define the prolongation of the grooves 27 and house the tie-rods 35 (FIG. 1).

Furthermore, all the connection plates 46, 47, 48, 49, 51, 52 and 53 share the common characteristic of extending about the axis A through approximately 120° so that three of the connection plates 46, 47, 48, 49, 51, 52, 53 lying in the same plane transverse to the axis A and arranged about the axis A substantially define a ring.

In effect, the head 29 comprises, in succession, starting from the stator pack 25, two rings 55, each of which is formed by three connection plates 46, two rings 56, each of which is formed by three connection plates 47, two rings 57, each of which is formed by three connection plates 48, and two rings 58, each of which is formed by three connection plates 49.

Likewise, the head 28 comprises, in succession, starting from the stator pack 25, the annular connection plate 50, one ring 55 formed by three connection plates 46, one ring 59 formed by three connection plates 51, one ring 56 formed by three connection plates 47, one ring 60 formed by three connection plates 52, one ring 57 formed by three connection plates 48, one ring 61 formed by three connection plates 52, and one ring 58 formed by three connection plates 49.

In this way, the connection plates 46, 47, 48, 49, 50, 51, 52, 53 are packed to the stator pack 25 and to one another and are shaped so as to define the prolongation of the outer face 36 of the stator pack 25.

As described previously, the angular extension of the connection plates 46, 47, 48, 49, 51, 52 and 53 is slightly less than 120° so that the connection plates 46, 47, 48, 49, 51, 52 and 53 lying in the same plane to define the rings 55, 56, 57, 58, 59, 60 and 61 are spaced apart by the respective adjacent connection plates 46, 47, 48, 49, 51, 52 and 53 in a circumferential direction to form gaps that are then filled with resin in the step of impregnation described previously.

With reference to FIG. 4, the annular connection plate 50 is separated from the stator pack 25 by an insulating sheet 62. Likewise, each ring 55, 56, 57, 58, 59, 60 and 61 is separated from an adjacent ring 55, 56, 57, 58, 59, 60 and 61 by an insulating sheet (not illustrated in the attached figures) and has characteristics similar to those illustrated with reference to the sheet 62.

Figure 6:
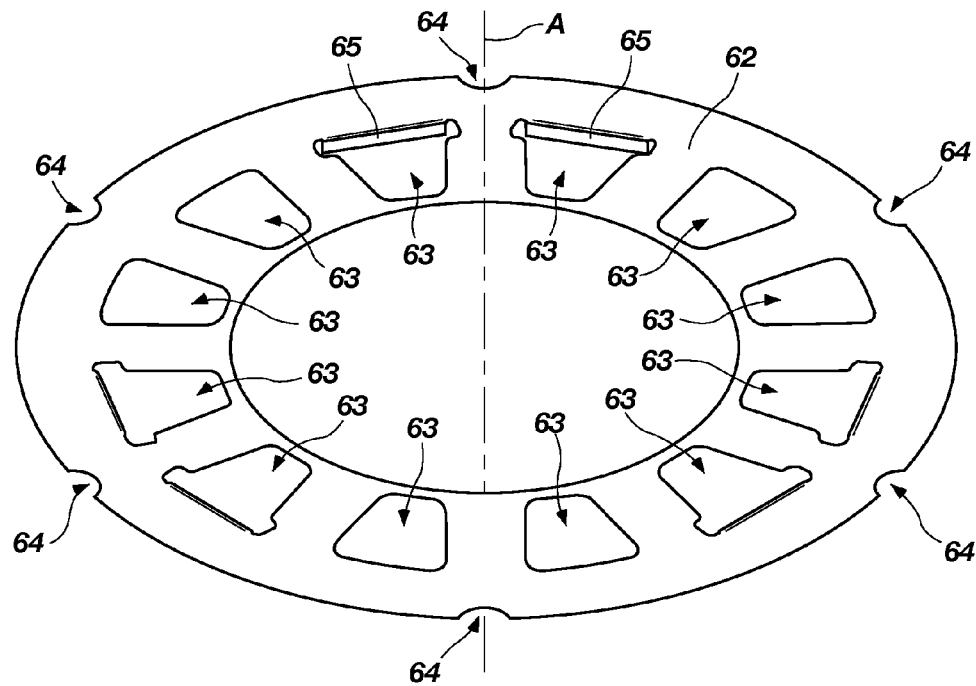
FIG. 6 is a perspective view, with parts removed for reasons of clarity, of a detail of the electrical machine of FIG. 1.

In greater detail and with reference to FIG. 6, each sheet 62 has the shape of a ring and comprises openings 63 uniformly distributed along the sheet 62, in the case in point, twelve openings 63, and six notches 64, which are arranged along the outer profile. Each notch 64 is aligned to a groove 37 (FIG. 5) and to a groove 54. Each opening 63 is sized so as to enable passage of a set of bars 30, 31, 32 and 33 or, as in the case of the sheet 62 of FIG. 5, of a single bar 33. Clearly, the opening 63 can assume shapes and dimensions different for each insulating sheet 62 according to the number and the type of bars 30, 31, 32, 33 that pass through the opening 63. Also the number of openings can vary from a maximum of twelve (FIG. 6) to a minimum of three (FIG. 5).

With reference to the sheet 62 of FIG. 6, six of the twelve openings 63 have a cross section that is larger at the outer edge of the opening 63 and corresponds to the end cross section of the slots 27 provided with the undercut 45 (FIG. 3). Each of the six openings 63 with oversized section is provided with a tab 65, set parallel to the axis A and in a position corresponding to the outer edge of the opening 63, and is designed to engage the undercut 45 of FIG. 3 in particular the bottom face of the undercut.

Figure 7:
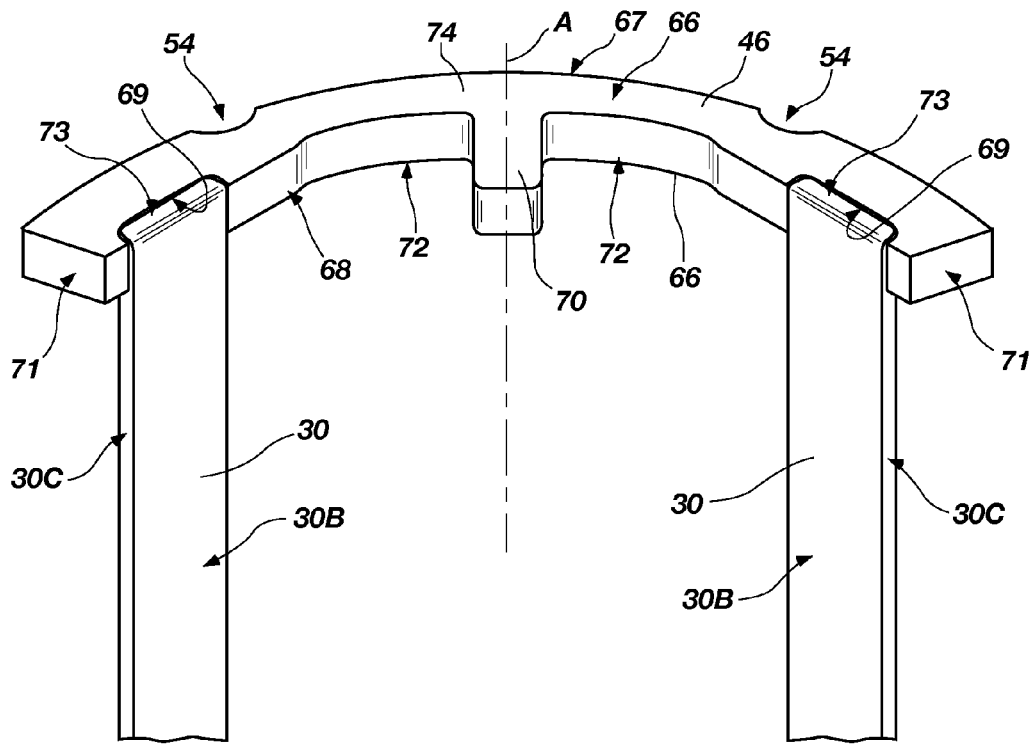
FIG. 7 is a perspective view, at an enlarged scale and with parts removed for reasons of clarity, of a further detail of the electrical machine of FIG. 1.

With reference to FIG. 7, a connection plate 46 is welded to two bars 30. The connection plate comprises a main arched body 74 and a rectilinear arm 70 that extends from the main body 74 in a radial direction towards the axis A from the centre of the main body 70. The connection plate 46 has two plane faces 66 set parallel to one another, which define the thickness of the plate 46 of the main body 74 and of the arm 70. The main body 74 is delimited by a curved outer face 67, made along which are two grooves 54, and an inner face 68, made along which are two seats 69.

The arm 70 extends radially between the two seats 69 and two end faces 71 as far as the inner surface 38 of the stator pack 25.

The seats 69 face the axis A and are designed to house two respective bars 30. The plate 46 in contact with one of the bars 30 at a respective seat along a part of the face 30A and parts of the two inclined faces 30C. The bar 30 is welded to the connection plate 46 in a position corresponding to the seat 69 with an electrical-resistance welding technique. Consequently, a portion of the face 30A and of the inclined faces 30C is welded to the connection plate 46 along the entire extension of the seat 69 by localized melting of the material defining the connection plate 46 and the bar 30.

According to one variant, the welding technique envisages the application of molten material, in particular of a silver alloy.

The connection plate 46 has a constant thickness equal to the distance between the side faces 66 and an irregular radial height. In fact, the main body 74 of the plate 46 has a variable average height in a radial direction, it being maximum in the proximity of the seats 69 and minimum at the side of the arm 70. In effect, the connection plate 46 has two compartments 72 arranged on opposite sides of the arm 70 and designed to enable passage of two bars 30 without any contact with the connection plate 46 and designed to be welded to respective connection plates 46 or 51. Furthermore, the inner face 68 in a position corresponding to said compartments 72 is designed to be set in contact with two respective tabs 65 of a sheet 62.

In addition, the bar 30 has an end face 73, which is set flush with one of the side faces 66. In general, each of the bars 30, 31, 32, 33 has a length such as to be set flush with a respective face 66 of a connection plate 46, 47, 48, 49, 50, 51, 52, 53.

The structural characteristics defining the connection plate 46 are substantially valid also for the connection plates 47, 48, 49, 51, 52 and 53, with some variations of a dimensional nature.

For instance, the connection plates 47 have an average radial height greater than the height of the connection plates 46 (with reference to the respective main bodies) because, keeping the same dimension of the external face 67, they are designed to connect two bars 31 arranged radially towards the inside with respect to the bars 30, and must enable passage of the bars 31, 32, and 33. The connection plates 47 are thinner, in an axial direction, than the connection plates 46 in such a way as to compensate for the greater extension in a radial direction of the connection plates 47 with respect to the connection plates 46 and so that the mass of conductive material of the connection plates 46 and 47 will be the same. The same criterion is applied to all the connection plates 46, 47, 48, 49, 51, 52 and 53: the connection plates 48 have an average radial height greater than the height of the connection plates 47 and are hence axially thinner than the connection plates 47. The same applies to the connection plates 49, which have a greater average radial height and a smaller thickness than the connection plates 48.

Similar sizes apply also to the connection plates 51, 52, 53, which, unlike the connection plates 46, 47, 48 and 49, present a slight asymmetry owing to the fact that said connection plates 51, 52, 53 provide asymmetrical connections, i.e., between the bars 30, 31, 32 and 33 that occupy different positions in the slots 27. Consequently, each connection plate 51, 52 and 53 will have a different average radial height in a position corresponding to its own seats 69.

In general, the thickness of the connection plates 46, 47, 48, 49, 50, 51, 52, 53 decreases starting from the stator pack 25 towards the outside, whilst the average radial height of the connection plates 46, 47, 48, 49, 50, 51, 52, 53 increases starting from the stator pack 25.

Figure 8:
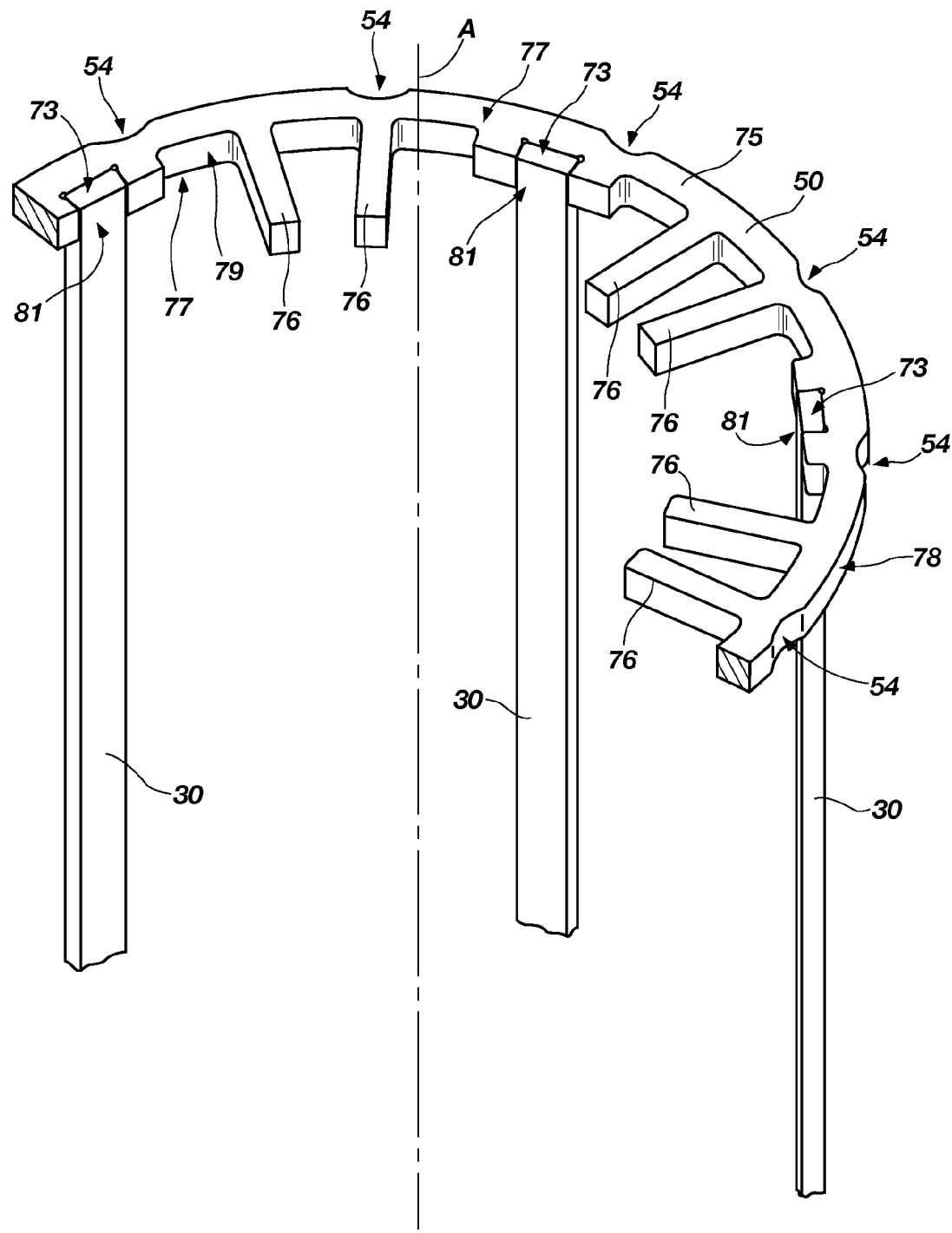
FIG. 8 is a perspective view, with parts removed for reasons of clarity, of a further detail of the electrical machine of the FIG. 1.

With reference to FIG. 8, the annular star-centre connection plate 50 is welded to three bars 30. The annular connection plate 50 comprises a circumferential main body 75 and a plurality of rectilinear arms 70 that extend from the main body 75 in a radial direction towards the axis A from the centre of the main body 70. The annular connection plate 50 has two plane faces 77 set parallel to one another, which define the thickness of the annular connection plate 50 of the main body 75 and of the arm 76. The main body 75 is delimited by a curved outer face 78, made along which are a plurality of grooves 54, an inner face 79, made along which are three seats 80 and extending radially from which towards the axis A are the arms 76.

The seats 80 are set facing the axis A and are designed to house three respective bars 30, which are welded to the annular connection plate according to the modalities described with reference to FIG. 7.

The arms 76 are set side by side in twos.

The connection plate 46 has a constant thickness equal to the distance between the side faces 77 and an irregular radial height. In fact, the main body 75 of the annular connection plate 50 has a variable average height in a radial direction, it being maximum in the proximity of the seats 69 and minimum at the side of the arm 70.

Finally, it is evident that modifications and variations can be made to the electrical machine described herein, without thereby departing from the scope of the annexed claims.

In particular, even though the present description regards a stator with twelve slots, it is understood that the invention is applicable also to a stator with a greater number of slots. The present invention proves particularly advantageous owing to the fact that it exploits the space in a position corresponding to the heads to the maximum, thanks to the connection plates of large dimensions that guarantee high levels of performance, but at the same time enable reduction to a minimum of the overall dimensions of the electrical machine.

The invention claimed is:

1. A multiphase synchronous electrical machine for converting kinetic energy into electrical energy and electrical energy into kinetic energy on board a transport vehicle, the electrical machine comprising:
   a rotor extending along an axis;
   a stator including:
      a stator pack having slots; and
      an electrical winding extending in part in the slots and in part at two heads arranged on opposite sides of the stator pack, the electrical winding comprising bars housed in the slots and connected to one another at the heads; and
   wherein each of the heads comprises a plurality of connection plates, at least a portion of the connection plates comprising:
      a main body having at least two seats for housing the bars; and
      at least one arm that is set between the two seats and extends from the main body towards the axis, the at least one arm being integral with the main body.

2. The electrical machine according to claim 1, wherein the arm extends in a radial direction from the main body towards the axis.

3. The electrical machine according to claim 1, wherein the stator pack comprises an outer face and an inner face facing the rotor; the main body being aligned to the outer face.

4. The electrical machine according to claim 3, wherein a distal end of the arm is aligned to the inner face.

5. The electrical machine according to claim 1, wherein at least one of the connection plates has two substantially parallel faces set transverse to the axis that extend in a position corresponding to the arm, the distance between the faces defining the thickness of each connection plate.

6. The electrical machine according to claim 2, wherein the thicknesses of the connection plates decrease progressively according to the axial position of the connection plates from a maximum value starting from the stator pack to a minimum value in a position corresponding to a free end of the head.

7. The electrical machine according to claim 2, wherein each connection plate has an average height in a radial direction that increases progressively according to the axial position of the connection plates from a minimum value starting from a position close to the stator pack to a maximum value in a position corresponding to a free end of the head.

8. The electrical machine according to claim 1, wherein the main portion of each connection plate is shaped like the arc of a circle.

9. The electrical machine according to claim 5, wherein at least one of the connection plates comprises an annular star-centre connection plate, which is set about the axis, is connected to three bars, and is packed to the stator pack; the annular star-centre connection plate comprising a plurality of arms.

10. The electrical machine according to claim 9, wherein the annular star-centre connection plate are separated from one another and from the stator pack by insulating sheets, provided with openings for the passage of the bars.

11. The electrical machine according to claim 1, wherein the at least one arm is cantilevered and includes a first end connected to the main body and a second free end that extends from the main body towards the axis.

12. A multiphase synchronous electrical machine for converting kinetic energy into electrical energy and electrical energy into kinetic energy on board a transport vehicle, the electrical machine comprising:
   a rotor extending along an axis; and
   a stator including:
      a stator pack having an outer face, an inner face facing the rotor, and slots; and
      an electrical winding extending in part in the slots and in part at two heads arranged on opposite sides of the stator pack, the electrical winding comprising bars housed in the slots and connected to one another at the heads, the heads include a plurality of connection plates, at least a portion of the connection plates comprising a main body having at least two seats for housing the bars and at least one arm having a distal end aligned to the inner face of the stator pack that extends from the main body towards the axis.

13. A multiphase synchronous electrical machine for converting kinetic energy into electrical energy and electrical energy into kinetic energy on board a transport vehicle, the electrical machine comprising:
   a rotor extending along an axis;
   a stator including:
      a stator pack having slots; and
      an electrical winding extending in part in the slots and in part at two heads arranged on opposite sides of the stator pack, the electrical winding comprising bars housed in the slots and connected to one another at the heads; and
   wherein each of the heads comprises a plurality of connection plates, at least a portion of the connection plates comprising:
      a main body having at least two seats for housing the bars; and
      at least one arm that is set between the two seats, the at least one arm being cantilevered having a first end connected to the main body and a second free end that extends from the main body towards the axis.

* * * * *